United States Patent
Batra et al.

(10) Patent No.: US 12,176,163 B2
(45) Date of Patent: Dec. 24, 2024

(54) ELECTRIC GRID AND METHOD FOR OPERATING AN ELECTRIC GRID

(71) Applicant: Siemens Aktiengesellschaft, Munich (DE)

(72) Inventors: Shivansh Batra, Offenbach am Main (DE); Thomas Beckert, Nuremberg (DE); Feng Du, Shanghai (CN); Michael Hein, Kuemmersbruck (DE); Yi Zhu, Kuemmersbruck (DE)

(73) Assignee: Siemens Aktiengesellschaft, Munich (DE)

(*) Notice: Subject to any disclaimer, the term of this patent is extended or adjusted under 35 U.S.C. 154(b) by 254 days.

(21) Appl. No.: 17/599,103

(22) PCT Filed: Sep. 13, 2019

(86) PCT No.: PCT/EP2019/074544
§ 371 (c)(1),
(2) Date: Sep. 28, 2021

(87) PCT Pub. No.: WO2020/200495
PCT Pub. Date: Oct. 8, 2020

(65) Prior Publication Data
US 2022/0166214 A1 May 26, 2022

(51) Int. Cl.
*H02H 7/26* (2006.01)
*H01H 9/54* (2006.01)
(Continued)

(52) U.S. Cl.
CPC .......... *H01H 33/596* (2013.01); *H01H 9/542* (2013.01); *H02H 1/0007* (2013.01);
(Continued)

(58) Field of Classification Search
CPC ........ H02H 3/08; H02H 3/087; H02H 1/0007; H02H 7/1252; H02H 7/1257; H02H 7/268;
(Continued)

(56) References Cited

U.S. PATENT DOCUMENTS

| 5,654,859 A | 8/1997 | Shi |
| 8,803,358 B2 | 8/2014 | Hafner et al. |

(Continued)

FOREIGN PATENT DOCUMENTS

| CA | 2910979 A1 | 1/2015 |
| CN | 101741057 A | 6/2010 |

(Continued)

OTHER PUBLICATIONS

PCT International Search Report and Written Opinion of International Searching Authority mailed Dec. 9, 2019 in PCT International Application No. PCT/EP2019/074544 filed Sep. 13, 2019.

(Continued)

*Primary Examiner* — Tuan T Dinh
(74) *Attorney, Agent, or Firm* — Harness, Dickey & Pierce, P.L.C.

(57) ABSTRACT

An electric grid includes feed-ins, loads, and a distribution grid, which is arranged therebetween. The distribution grid comprises at least one busbar and at least one device for opening or closing a DC circuit. The at least one device includes an electric switch for opening or closing the DC circuit, a fault current detector, a trigger unit, a precharging device, and a control unit for automatically closing the electric switch after the precharging process. The electric switch opens the DC circuit via the trigger unit if a fault current is detected by the fault current detector, and the precharging device restores the voltage on the busbar prior to closing the electric switch.

19 Claims, 6 Drawing Sheets

FIG 5

(51) Int. Cl.
  *H01H 33/59* (2006.01)
  *H02H 1/00* (2006.01)
  *H02H 3/087* (2006.01)
  *H02H 7/125* (2006.01)
  *H02H 9/00* (2006.01)
  *H02J 1/10* (2006.01)
  *H02J 1/12* (2006.01)

(52) U.S. Cl.
  CPC .......... *H02H 3/087* (2013.01); *H02H 7/1252* (2013.01); *H02H 7/1257* (2013.01); *H02H 7/268* (2013.01); *H02H 9/001* (2013.01); *H02J 1/10* (2013.01); *H02J 1/12* (2013.01); *H01H 2009/544* (2013.01)

(58) Field of Classification Search
  CPC ...... H02J 1/00; H02J 1/10; H02J 1/12; H01H 33/596
  USPC .................................................. 361/2, 8, 14
  See application file for complete search history.

(56) References Cited

U.S. PATENT DOCUMENTS

| | | | |
|---|---|---|---|
| 9,042,146 B2 | 5/2015 | Weiss et al. | |
| 9,184,003 B2 | 11/2015 | Crane | |
| 9,525,284 B2* | 12/2016 | Kim | H02J 3/381 |
| 9,698,589 B1 | 7/2017 | Leyh | |
| 9,755,433 B2 | 9/2017 | Xu et al. | |
| 9,853,536 B2* | 12/2017 | Xu | H02J 1/002 |
| 10,693,293 B2 | 6/2020 | Qi et al. | |
| 10,944,254 B2 | 3/2021 | Shi et al. | |
| 2004/0027734 A1* | 2/2004 | Fairfax | H01H 9/542 |
| | | | 361/2 |
| 2005/0052798 A1* | 3/2005 | Grisoni | H02H 5/041 |
| | | | 361/42 |
| 2007/0014062 A1 | 1/2007 | Fischer | |
| 2007/0077830 A1 | 4/2007 | Rzadki et al. | |
| 2010/0118450 A1 | 5/2010 | Ritzinger et al. | |
| 2010/0231042 A1 | 9/2010 | Weale | |
| 2010/0292853 A1* | 11/2010 | McDonnell | H02J 3/34 |
| | | | 700/287 |
| 2011/0127853 A1* | 6/2011 | Fujita | G01D 4/004 |
| | | | 307/131 |
| 2011/0298283 A1 | 12/2011 | Sannino et al. | |
| 2012/0218676 A1* | 8/2012 | Demetriades | H01H 9/542 |
| | | | 361/115 |
| 2013/0021708 A1* | 1/2013 | Demetriades | H02H 3/023 |
| | | | 361/102 |
| 2013/0106184 A1 | 5/2013 | Hafner et al. | |
| 2013/0121051 A1 | 5/2013 | Weiss et al. | |
| 2013/0270902 A1* | 10/2013 | Andersen | B60R 16/03 |
| | | | 307/9.1 |
| 2013/0307444 A1 | 11/2013 | Settemsdal | |
| 2013/0314828 A1* | 11/2013 | Chen | H02H 9/02 |
| | | | 361/63 |
| 2014/0063669 A1* | 3/2014 | Lundqvist | H02H 3/30 |
| | | | 361/79 |
| 2014/0078622 A1* | 3/2014 | Crane | H01H 33/596 |
| | | | 361/8 |
| 2014/0254050 A1* | 9/2014 | Haines | H02H 3/16 |
| | | | 361/42 |
| 2014/0361621 A1* | 12/2014 | Lindtjorn | H02J 1/06 |
| | | | 307/38 |
| 2015/0014277 A1 | 1/2015 | Theisen et al. | |
| 2015/0137595 A1* | 5/2015 | Xu | H02J 9/06 |
| | | | 307/23 |
| 2016/0152151 A1 | 6/2016 | Yang et al. | |
| 2016/0172838 A1* | 6/2016 | Luebke | H02H 3/006 |
| | | | 361/93.1 |
| 2016/0190791 A1 | 6/2016 | Sim | |
| 2016/0336734 A1 | 11/2016 | Lee et al. | |
| 2017/0054291 A1 | 2/2017 | Qi et al. | |
| 2017/0098931 A1 | 4/2017 | Gerdinand et al. | |
| 2017/0170663 A1 | 6/2017 | Christ et al. | |
| 2017/0373498 A1 | 12/2017 | Haugan et al. | |
| 2018/0034258 A1* | 2/2018 | Schweitzer, III | H02H 3/05 |
| 2018/0159315 A1 | 6/2018 | Aagesen et al. | |
| 2018/0240627 A1 | 8/2018 | Matsuo et al. | |
| 2018/0241200 A1 | 8/2018 | Hu et al. | |
| 2019/0020193 A1* | 1/2019 | Cao | H01H 33/596 |
| 2019/0190258 A1* | 6/2019 | Shi | H02H 7/268 |
| 2019/0267842 A1 | 8/2019 | Richter | |
| 2019/0334340 A1 | 10/2019 | Niehoff | |
| 2019/0353689 A1* | 11/2019 | Hauer | H02H 3/10 |
| 2020/0119548 A1 | 4/2020 | Haugan | |
| 2021/0339692 A1 | 11/2021 | Miro Bargallo et al. | |
| 2021/0359632 A1 | 11/2021 | Valasek et al. | |
| 2022/0020544 A1 | 1/2022 | Zhu | |
| 2022/0166214 A1 | 5/2022 | Batra et al. | |
| 2022/0172914 A1 | 6/2022 | Batra et al. | |

FOREIGN PATENT DOCUMENTS

| | | |
|---|---|---|
| CN | 202305715 U | 7/2012 |
| CN | 102696087 A | 9/2012 |
| CN | 102959818 A | 3/2013 |
| CN | 103457246 A | 12/2013 |
| CN | 203352192 U | 12/2013 |
| CN | 103762546 A | 4/2014 |
| CN | 104242229 A | 12/2014 |
| CN | 104518564 A | 4/2015 |
| CN | 104617573 A | 5/2015 |
| CN | 104638618 A | 5/2015 |
| CN | 105162093 A | 12/2015 |
| CN | 105207178 A | 12/2015 |
| CN | 105305372 A | 2/2016 |
| CN | 105322514 A | 2/2016 |
| CN | 105529677 A | 4/2016 |
| CN | 105743058 A | 7/2016 |
| CN | 105762775 A | 7/2016 |
| CN | 106099878 A | 11/2016 |
| CN | 106253243 A | 12/2016 |
| CN | 106486965 A | 3/2017 |
| CN | 106663557 A | 5/2017 |
| CN | 106786403 A | 5/2017 |
| CN | 206442309 U | 8/2017 |
| CN | 107210603 A | 9/2017 |
| CN | 107276045 A | 10/2017 |
| CN | 107565524 A | 1/2018 |
| CN | 107768195 A | 3/2018 |
| CN | 107810583 A | 3/2018 |
| CN | 108092253 A | 5/2018 |
| CN | 108152633 A | 6/2018 |
| CN | 108448548 A | 8/2018 |
| CN | 109193661 A | 1/2019 |
| CN | 109494693 A | 3/2019 |
| CN | 109494695 A | 3/2019 |
| EP | 2523331 A1 | 11/2012 |
| EP | 2634885 A1 | 9/2013 |
| EP | 3109964 A1 | 12/2016 |
| EP | 3379674 A1 | 9/2018 |
| EP | 3477809 A1 | 5/2019 |
| KR | 20160035845 A | 4/2016 |
| WO | WO-2005049418 A2 | 6/2005 |
| WO | WO-2012/123015 A1 | 9/2012 |
| WO | WO 2013131782 A1 | 9/2013 |
| WO | WO 2018028247 A1 | 2/2018 |
| WO | WO 2018109161 A1 | 6/2018 |

OTHER PUBLICATIONS

U.S. Appl. No. 17/599,055, filed Sep. 28, 2021.
U.S. Appl. No. 17/599,067, filed Sep. 28, 2021.
U.S. Appl. No. 17/599,076, filed Sep. 28, 2021.
U.S. Appl. No. 17/599,119, filed Sep. 28, 2021.
PCT International Search Report and Written Opinion of International Searching Authority mailed Dec. 10, 2019 in PCT International Application No. PCT/EP2019/074545 filed Sep. 13, 2019.
PCT International Search Report and Written Opinion of Interna-

(56) References Cited

OTHER PUBLICATIONS tional Searching Authority mailed Dec. 10, 2019 in PCT International Application No. PCT/EP2019/074539 filed Sep. 13, 2019.
ABB Substation Automation Products and Systems, "REF 541, 543, 545 Protection, Monitoring and Control Technical Reference Manual Part 1, General," 1 MRS750527-MUM, Sep. 29, 1997.
PCT International Search Report and Written Opinion of International Searching Authority mailed Dec. 10, 2019 in PCT International Application No. PCT/EP2019/074541 filed Sep. 13, 2019.
PCT International Search Report and Written Opinion of International Searching Authority mailed Dec. 6, 2019 in PCT International Application No. PCT/EP2019/074542 filed Sep. 13, 2019.
Lin Wenfu:; "Electrical Operation of Power Units"; pp. 356-358; China Water & Power Press, Mar. 2007 (and English translation thereof).

* cited by examiner

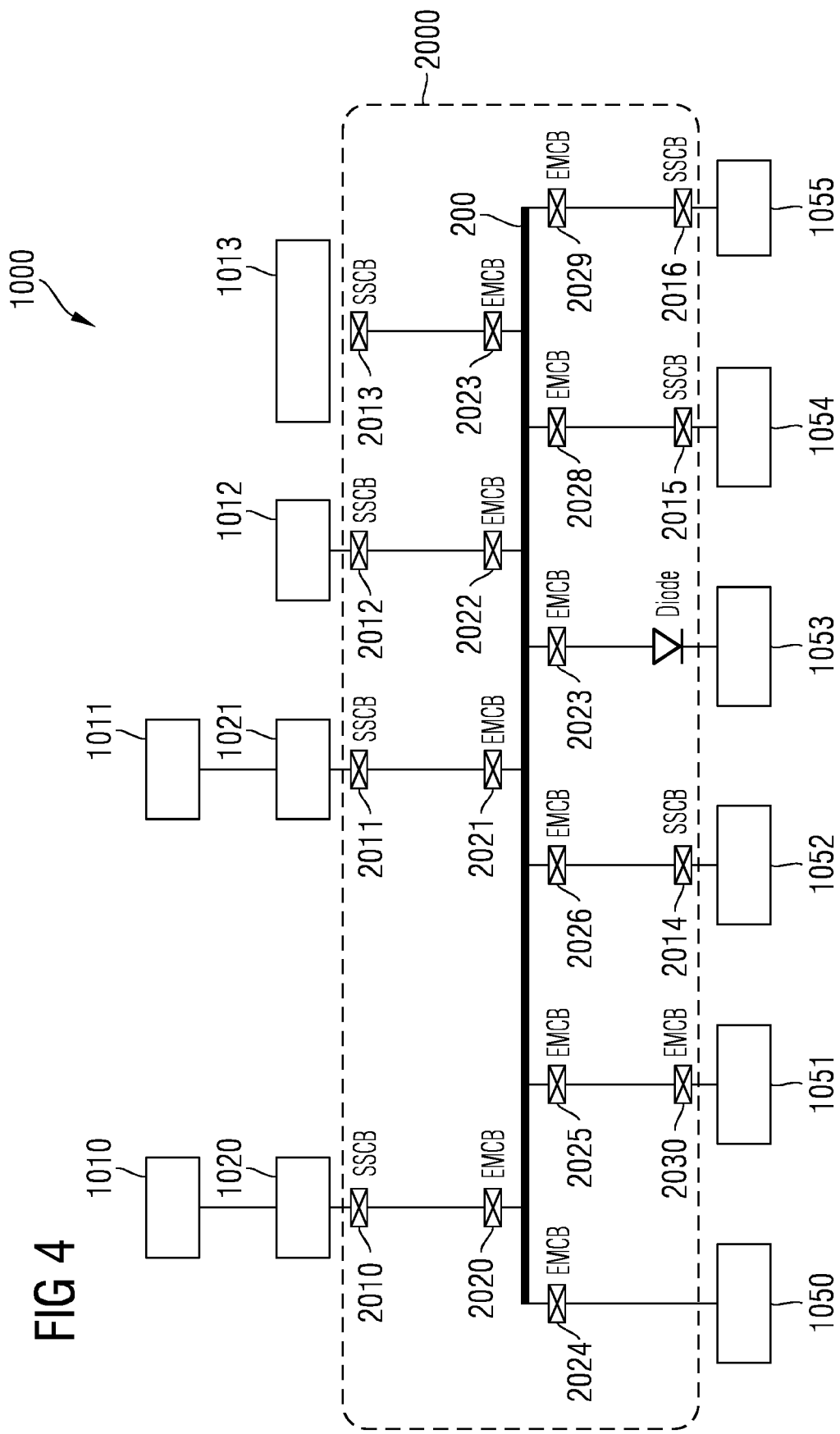

ELECTRIC GRID AND METHOD FOR OPERATING AN ELECTRIC GRID

CROSS-REFERENCE TO RELATED APPLICATIONS

This application is the National Phase under 35 U.S.C. § 371 of PCT International Application No. PCT/EP2019/074544, which has an international filing date of Sep. 13, 2019, and which claims priority to PCT International Application No. PCT/CN2019/080553 filed Mar. 29, 2019, PCT International Application No. PCT/CN2019/080554 filed Mar. 29, 2019, and PCT International Application No. PCT/CN2019/080558 filed Mar. 29, 2019.

FIELD

Example embodiments of the present application generally relate to an electrical grid and to a method for operating an electrical grid.

BACKGROUND

DC distribution grids, especially in the case of in-feeds from renewable energy sources in parallel with other grid in-feeds, offer advantages over AC distribution grids in terms of lower costs and in terms of higher energy efficiency. When using renewable energy sources, for example a photovoltaic module, it is possible to replace a DC/AC/DC converter with a simple DC/DC converter. Batteries as energy storage units are able to be connected to the system more easily, and capacitor banks are able to be connected directly to the system without further converters.

In order to connect and feed in from an AC (alternating current) grid, use may be made of regulated and unregulated rectifiers. Active front end (AFE) technology is preferred for feeding the energy in from AC sources or for returning energy in the case of recovered braking energy from motors: whereas, in the case of active front end (AFE) devices, the AC side of the grid is stabilized, and the grid quality is thus compensated overall with a reactive energy supply, the braking energy from motors is able to be supplied to the distribution system.

DC grids, however, also exhibit challenges in terms of protection against short-circuits or other fault sources. In one exemplary DC grid according to the illustration in FIG. 1 containing feeders 1010; 1011; 1012; 1013 and consumers 1050; 1051; 1052; 1053; 1054 and a distribution grid 2000 installed between them, containing conventional electromechanical protection devices (for example molded case circuit breaker, MCCB), these lose their selectivity due to the fast self-protection functions of the power electronics in the AC/DC converters. In the illustration of FIG. 1, the feeders 1010; 1011 may for example be AC sources that are fed into the system via active front ends (AFE) 1020; 1021.

Freewheeling diodes are not able to be protected sufficiently through the self-protection of the converters and fuses on the AC side, since severe damage may be caused by electric current owing to a possible voltage reversal in the event of LRC oscillations in the fault path. This is observed especially when the active front end (AFE) is not connected to the busbar in a manner protected against short circuits. Following switching off of the IGBTs, the diodes may likewise act as uncontrolled rectifiers. The fault current in this case supplied from the AC side and is possibly not able to be deactivated quickly enough by the fuses, and may thus destroy the diodes.

The discharging of a capacitor bank or of DC links during a severe fault scenario generates extremely high current peaks that flow within time intervals of ms (milliseconds). Conventional electromechanical switches are not fast enough to deactivate such a fault current. The weakest feeder or consumer path having the lowest rated current in such a system containing multiple feeders then has the highest ratio of maximum short-circuit current to nominal current.

The main problems in a DC distribution system are the possible destruction of freewheeling diodes due to a voltage reversal, the capacitive discharging and the selectivity of the protection devices with respect to the active front ends (AFE).

Capacitors are additionally contained in each converter (AC/DC or DC/DC) or inverter (DC/AC) on the DC side, both in the case of feeders and in the case of consumers.

FIG. 2 illustrates possible positions of faults 1500; 1501; 1502; 1503; 1504; 1505; 1506; 1507; 1508 in a distribution grid. Even a fault on the consumer side in the case of a motor without feedback may be supplied from both directions: current is able to flow from the feeders and from other branches of the consumers and through the discharging of DC links (DC link capacitors) that are typically used in DC/AC inverters. When planning a grid, it therefore has to be taken into consideration to connect power converters, such as for example active front ends (AFE), to a DC busbar 200 in a manner protected against short circuits. Otherwise, two protection apparatuses are required, as illustrated in FIG. 3B.

The main problem in electrical DC grids is the high number and capacitance of the capacitors in the system. In the case of low fault resistances, this means that these capacitors are discharged within 2 to 3 ms (milliseconds), together with extremely high current peaks. Due to a voltage reversal, a high current is generated through the freewheeling diodes within the same time span. In order to prevent damage to the cable and the freewheeling diodes, the fault current has to be interrupted very quickly. This is also necessary when it is intended to create selectivity with respect to the power converters. Due to the nature of the electromechanical switches, their switching time for opening is at least a few ms (milliseconds). The discharging of the capacitors and the associated voltage dip on the distribution 2000 has then already taken place. A solution based only on electromechanical switches therefore cannot lead to protection of such a DC grid.

SUMMARY

Example embodiments of the invention provide an alternative electrical grid that improves upon or even overcomes the described disadvantages.

At least one example embodiment is directed to an electrical grid. Advantageous configurations are specified in the claims.

At least one other example embodiment, according to the invention, is directed to a method for operating an electrical grid. Advantageous configurations are specified in the claims.

An electrical grid, according to at least one example embodiment, is equipped with feeders (or feed-in devices), consumers (or loads) and an interposed distribution grid having at least one busbar and having at least one device for opening or closing a DC circuit, wherein the device comprises an electrical switch for opening or closing the DC circuit, a fault current identification mechanism or device,
a trip unit,
a pre-charging device, and
a control unit for automatically closing the electrical switch after the pre-charging,
wherein, upon the fault current identification mechanism detecting a fault current, the electrical switch opens the DC circuit by way of the trip unit and the pre-charging device re-establishes the voltage on the busbar before the electrical switch is closed, wherein the feeders are, in each case, able to be individually electrically disconnected by way of one of the devices for opening or closing a DC circuit.

According to at least one example embodiment, a reduced number of semiconductor switches are able to be used in the grid, such that costs are minimized along with power losses, since they are used only for feeders, energy storage units and large motor loads with power feedback. In the event of a fault, the fault current is able to be interrupted very quickly by way of the circuit breakers within a few, typically 10 μs (microseconds), and the fault is then able to be isolated at a relatively low speed. This makes it possible to use electromechanical electrical switches in the rest of the system. Since all of the feeders are disconnected directly from the grid in the event of a fault, only the electromechanical electrical switches that are responsible have to interrupt a significantly reduced fault current, and in some applications they may even switch in a current-free manner. This allows the electromechanical switches to be able to be dimensioned far smaller in comparison with electromechanical switches in conventional grids.

In one configuration, individual consumers may in each case be individually electrically disconnected by way of one of the devices for opening or closing a DC circuit, and the interposed distribution grid comprises electromechanical switches for isolating faults.

In a further configuration, the electrical switch in at least one device is a semiconductor switch.

In one configuration, the at least one device furthermore comprises a communication unit.

In a further configuration, the at least one device furthermore comprises a control unit for limiting a switch-on transient. This control unit may keep the high transient current below the deactivation threshold values of the device at switch-on.

In a further configuration, the pre-charging device re-establishes the voltage on the busbar after a first waiting time. As an alternative, the pre-charging device re-establishes the voltage on the busbar after receiving a command. The command may be received by the pre-charging device via the communication unit.

In a further configuration, the control unit for automatically closing the electrical switch closes said switch automatically after a second waiting time.

As an alternative, the control unit for automatically closing the electrical switch closes said switch following the re-establishment of a voltage on the busbar above a threshold value.

In a further configuration, the electrical grid is a DC circuit.

In a further configuration, the devices for opening or closing a DC circuit are arranged on high-capacity power converters, capacitor banks as energy storage units, photovoltaic installations, batteries or consumers with feedback depending on the size of the DC link and the electromechanical switches are arranged at the rest of the positions.

A method for operating an electrical grid, according to at least one example embodiment, comprises the steps of:
in the event of a fault, quickly opening all of the devices for opening or closing a DC circuit (close to the feeders) within μs (microseconds) in order to disconnect all of the feeders (including all of the energy sources and all installations capable of feedback);
after opening the devices, opening only electromechanical switches close to the fault location within ms (milliseconds) in order to isolate the fault; and then
automatically closing the devices for opening or closing a DC circuit.

In a further configuration, the method, according to at least one example embodiment of the invention, comprises the further step of:
when a fault is still detected following the automatic closure of the devices for opening or closing a DC circuit, finally opening the devices for opening or closing a DC circuit at the feeders.

BRIEF DESCRIPTION OF THE DRAWINGS

The above-described properties, features and advantages of this invention and the manner in which they are achieved will become clearer and more clearly comprehensible in connection with the following description of the embodiments that are explained in more detail in connection with the figures.

FIG. 4 shows an electrical grid, according to at least one example embodiment of the invention, containing feeders, consumers and a distribution grid.

DETAILED DESCRIPTION

Figure 1:
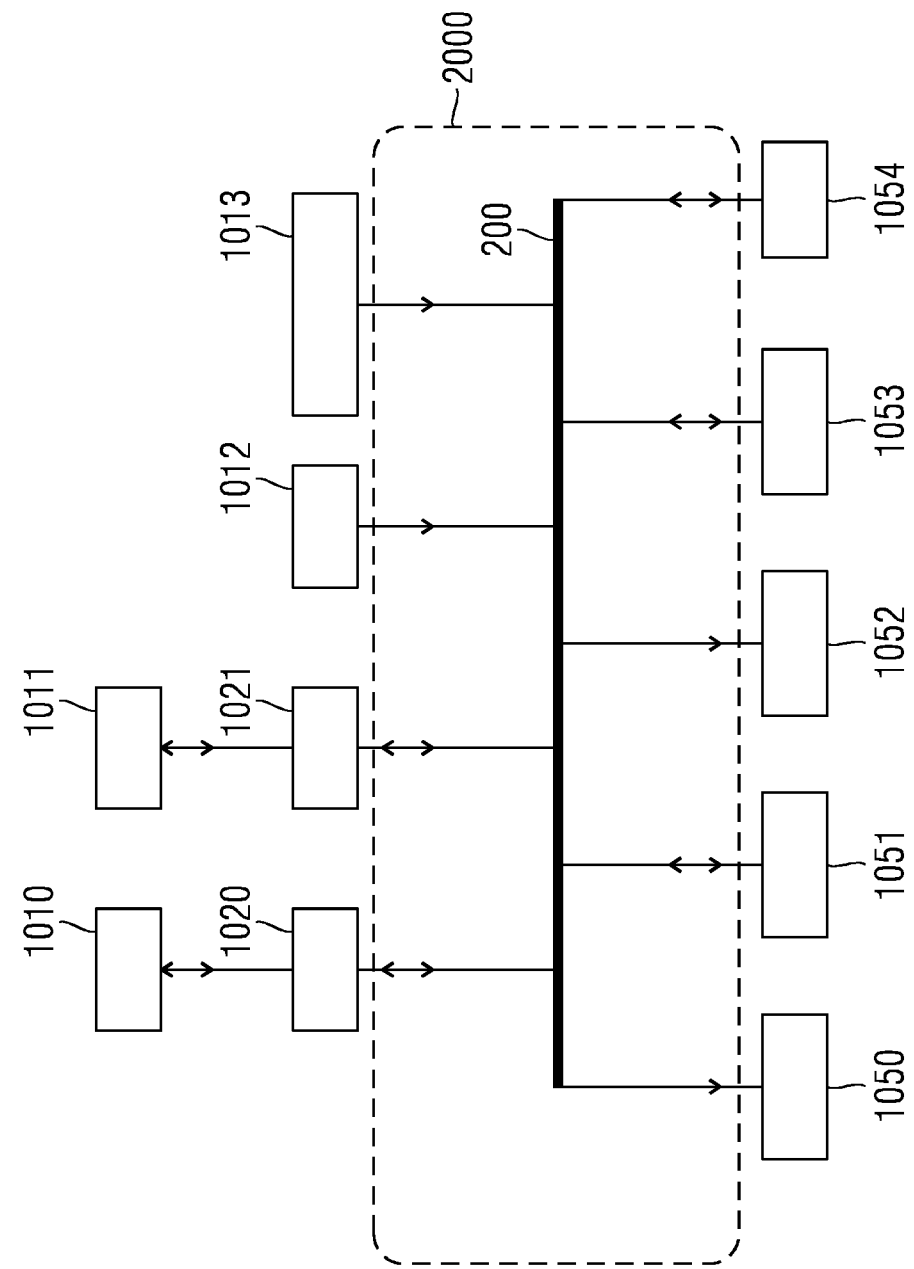
FIG. 1 shows an electrical grid containing feeders, consumers and a distribution grid.

An electrical grid, according to at least one example embodiment, is equipped with feeders (or feed-in devices), consumers (or loads) and an interposed distribution grid having at least one busbar and having at least one device for opening or closing a DC circuit, wherein the device comprises
an electrical switch for opening or closing the DC circuit,
a fault current identification mechanism or device,
a trip unit,
a pre-charging device, and
a control unit for automatically closing the electrical switch after the pre-charging,
wherein, upon the fault current identification mechanism detecting a fault current, the electrical switch opens the DC circuit by way of the trip unit and the pre-charging device re-establishes the voltage on the busbar before the electrical switch is closed, wherein the feeders are, in each case, able to be individually electrically disconnected by way of one of the devices for opening or closing a DC circuit.

According to at least one example embodiment, a reduced number of semiconductor switches are able to be used in the grid, such that costs are minimized along with power losses, since they are used only for feeders, energy storage units and large motor loads with power feedback. In the event of a fault, the fault current is able to be interrupted very quickly by way of the circuit breakers within a few, typically 10 μs (microseconds), and the fault is then able to be isolated at a relatively low speed. This makes it possible to use electromechanical electrical switches in the rest of the system. Since all of the feeders are disconnected directly from the grid in the event of a fault, only the electromechanical electrical switches that are responsible have to interrupt a significantly reduced fault current, and in some applications they may even switch in a current-free manner. This allows the electromechanical switches to be able to be dimensioned far smaller in comparison with electromechanical switches in conventional grids.

In one configuration, individual consumers may in each case be individually electrically disconnected by way of one of the devices for opening or closing a DC circuit, and the interposed distribution grid comprises electromechanical switches for isolating faults.

In a further configuration, the electrical switch in at least one device is a semiconductor switch.

In one configuration, the at least one device furthermore comprises a communication unit.

In a further configuration, the at least one device furthermore comprises a control unit for limiting a switch-on transient. This control unit may keep the high transient current below the deactivation threshold values of the device at switch-on.

In a further configuration, the pre-charging device re-establishes the voltage on the busbar after a first waiting time. As an alternative, the pre-charging device re-establishes the voltage on the busbar after receiving a command. The command may be received by the pre-charging device via the communication unit.

In a further configuration, the control unit for automatically closing the electrical switch closes said switch automatically after a second waiting time.

As an alternative, the control unit for automatically closing the electrical switch closes said switch following the re-establishment of a voltage on the busbar above a threshold value.

In a further configuration, the electrical grid is a DC circuit.

In a further configuration, the devices for opening or closing a DC circuit are arranged on high-capacity power converters, capacitor banks as energy storage units, photovoltaic installations, batteries or consumers with feedback depending on the size of the DC link and the electromechanical switches are arranged at the rest of the positions.

A method for operating an electrical grid, according to at least one example embodiment, comprises the steps of:
  in the event of a fault, quickly opening all of the devices for opening or closing a DC circuit (close to the feeders) within μs (microseconds) in order to disconnect all of the feeders (including all of the energy sources and all installations capable of feedback);
  after opening the devices, opening only electromechanical switches close to the fault location within ms (milliseconds) in order to isolate the fault; and then
  automatically closing the devices for opening or closing a DC circuit.

In a further configuration, the method, according to at least one example embodiment of the invention, comprises the further step of:
  when a fault is still detected following the automatic closure of the devices for opening or closing a DC circuit, finally opening the devices for opening or closing a DC circuit at the feeders.

FIG. 1 illustrates an exemplary DC grid with current flows under nominal conditions. Feeders 1010; 1011; 1012; 1013 are connected to consumers 1050; 1051; 1052; 1053; 1054 via a distribution grid 2000 by way of a busbar 200. Feeders 1010; 1011 may be for example AC sources that are connected to the distribution grid 2000 via an active front end (AFE) 1020; 1021. The currents may in this case flow bidirectionally into the distribution grid 2000 or out thereof. Feeder 1012 may for example be a photovoltaic installation, and feeder 1013 may be another type containing power converters. In the case of these feeders 1012; 1013, only a unidirectional current flow in the direction of the distribution grid 2000 is possible.

Something similar also applies to the consumers; some consumers allow a unidirectional current flow, and others allow a bidirectional current flow to the grid 2000. By way of example, consumer 1050 may be an ohmic load that allows only a unidirectional current flow in its direction. The same applies to motors without power feedback, for example consumer 1052. Consumers 1051; 1053; 1054 may for example be motors with power feedback, a capacitor bank as energy storage unit or a battery, wherein a bidirectional current flow to and from the distribution grid is possible in the case of these consumers.

Figure 2:
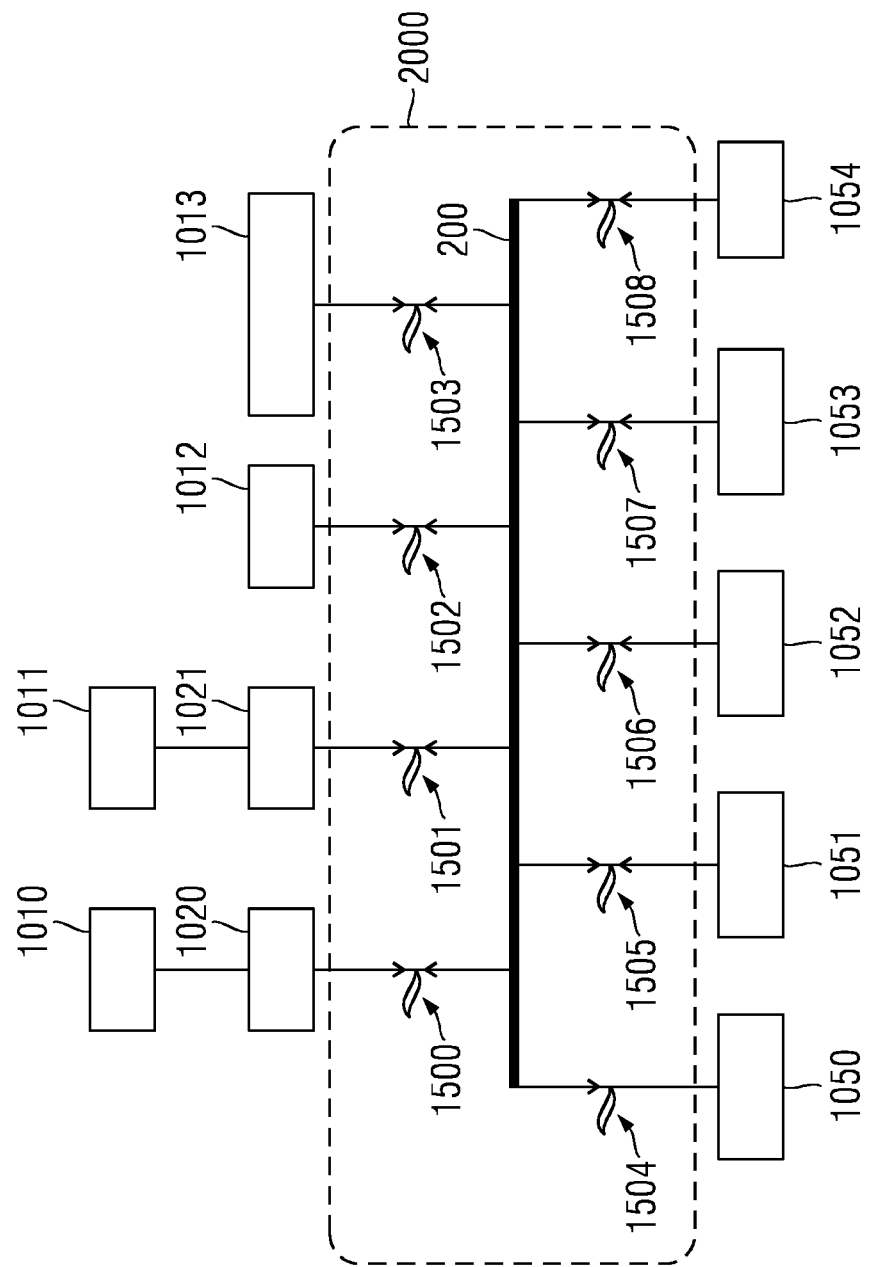
FIG. 2 shows an electrical grid containing feeders and consumers and possible faults.

FIG. 2 illustrates the electrical grid from FIG. 1 containing feeders 1010; 1011; 1012; 1013, consumers 1050; 1051; 1052; 1053; 1054 and an interposed distribution grid 2000, wherein the possible fault locations of faults 1500; 1501; 1502; 1503; 1504; 1505; 1506; 1507; 1508 are indicated. By way of example, a fault between consumer 1050 and the busbar 200 may occur at the fault location of the fault 1504.

Figure 3A:
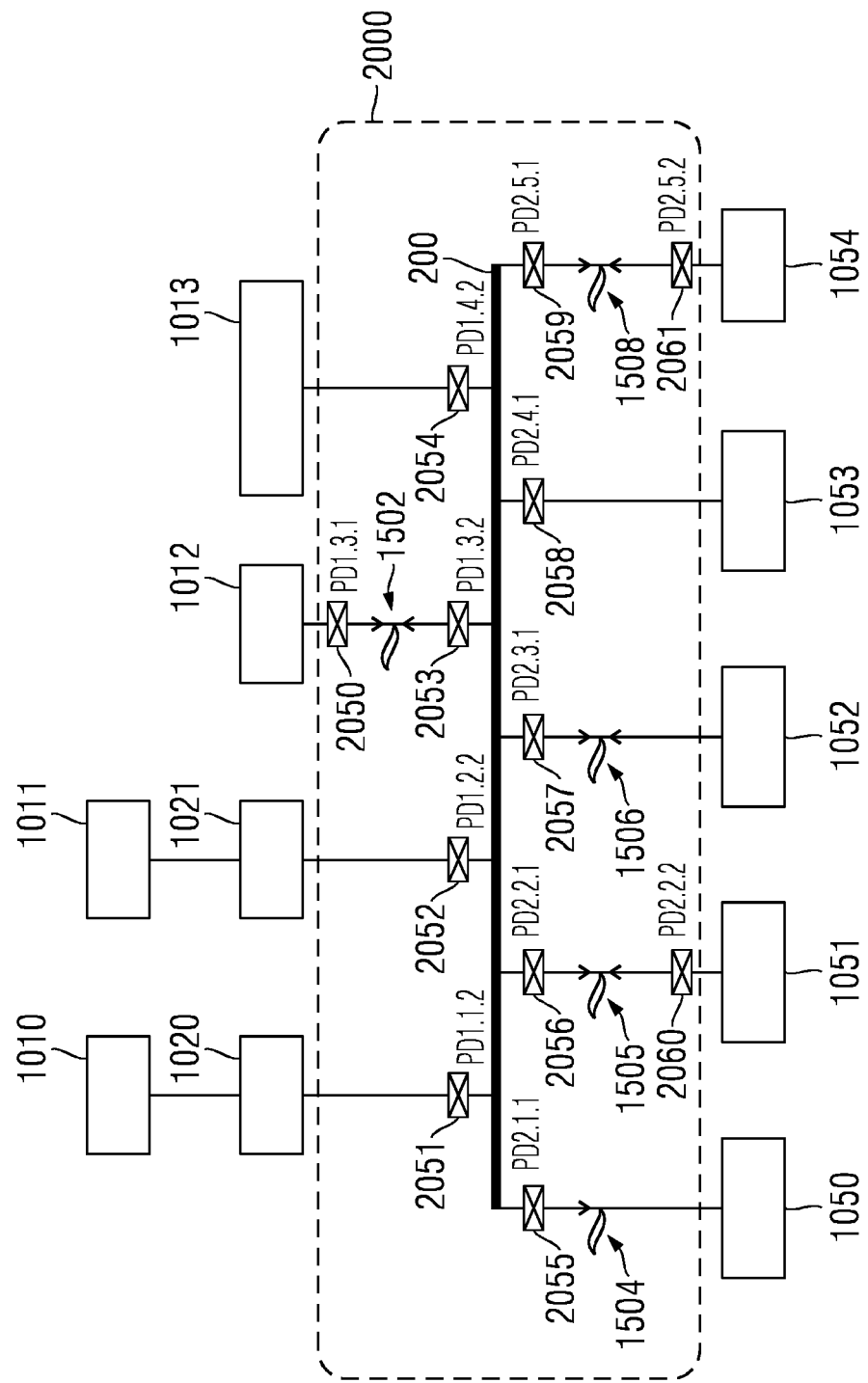
FIGS. 3A and 3B show an electrical grid containing feeders and consumers in the distribution grid and protection apparatuses.
Figure 3B:
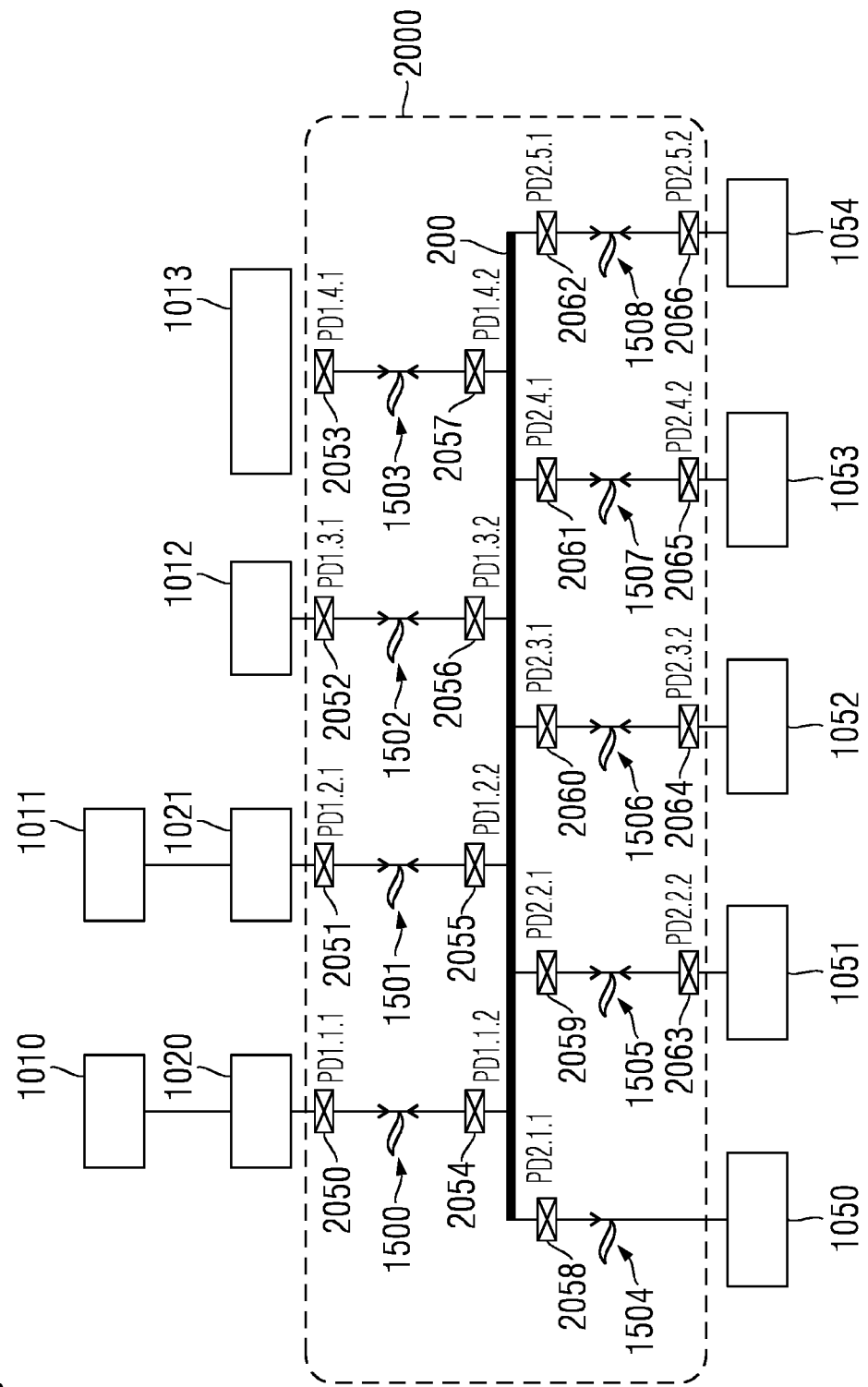

FIGS. 3A and 3B again illustrate the electrical grid from FIGS. 1 and 2, wherein the distribution grid 2000 comprises protection apparatuses 2050; 2051; 2052; 2053; 2054; 2055; 2056; 2057; 2058; 2059; 2060; 2061; 2062; 2063; 2064; 2065; 2066. Depending on which fault 1500; 1501; 1502; 1503; 1504; 1505; 1506; 1507; 1508 is accordingly intended to be intercepted, the protection apparatuses may be arranged in the distribution grid 2000.

FIG. 4 shows the electrical grid 1000, according to at least one example embodiment of the invention, containing feeders 1010; 1011; 1012; 1013, consumers 1050; 1051; 1052; 1053; 1054; 1055 and an interposed distribution grid 2000 having at least one busbar 200 and having at least one device 2010; 2011; 2012; 2013; 2014; 2015; 2016 for opening or closing a DC circuit.

The feeders 1010; 1011; 1012; 1013 may in each case be individually electrically disconnected by way of one of the devices 2010; 2011; 2012; 2013 for opening or closing a DC circuit. The devices 2010; 2011; 2012; 2013 for opening or closing a DC circuit are in each case arranged between the feeder and the busbar 200.

Individual consumers 1052; 1054; 1055 may furthermore also be individually electrically disconnected or be disconnected from the busbar 200 by way of one of the devices 2014; 2015; 2016 for opening or closing a DC circuit. The interposed distribution grid 2000, in order to isolate faults, furthermore comprises conventional electromechanical switches 2020; 2021; 2022; 2023; 2024; 2025; 2026; 2027; 2028; 2029; 2030. Individual outputs with consumers 1053 that contain for instance link circuit capacitors, but that are not capable of feedback may be protected on the busbar 200 by an electromechanical switch and close to the consumer by a diode.

The devices for opening or closing a DC circuit are arranged on high-capacity power converters, capacitor banks as energy storage units, photovoltaic installations, batteries or on consumers with feedback, depending on the size of the DC link.

The electrical grid 1000, according to at least one example embodiment of the invention, may be operated by way of the following method:

in the event of a fault, quickly opening all of the devices 2010; 2011; 2012; 2013; 2014; 2015; 2016 for opening or closing a DC circuit within μs (microseconds) in order to disconnect all of the feeders 1010; 1011; 1012; 1013;

after opening the devices 2010; 2011; 2012; 2013; 2014; 2015; 2016, opening only electromechanical switches (one or more of 2020; 2021; 2022; 2023; 2024; 2025; 2026; 2027; 2028; 2029; 2030) close to the fault location within ms (milliseconds) in order to isolate the fault; and then automatically closing the devices 2010; 2011; 2012; 2013; 2014; 2015; 2016 for opening or closing a DC circuit.

The method, according to at least one example embodiment of the invention, may furthermore comprise the step of:

when a fault is still detected following the automatic closure of the devices 2010; 2011; 2012; 2013; 2014; 2015; 2016 for opening or closing a DC circuit, finally opening the devices 2010; 2011; 2012; 2013; 2014; 2015; 2016 for opening or closing a DC circuit.

The following thus takes place in the event of a fault:

The devices 2010; 2011; 2012; 2013; 2014; 2015; 2016 for opening or closing a DC circuit and the electromechanical switch in the vicinity of the fault detect the fault simultaneously. All of the devices 2010; 2011; 2012; 2013; 2014; 2015; 2016 for opening or closing a DC circuit switch off immediately in order to prevent further feeding of the fault by the feeders. In the meantime, the closest electromechanical switch switches off in order to isolate the fault. An electromechanical switch having fast switching properties in the range of a few ms (milliseconds) is preferred for this purpose. The active front ends (AFE) are still operational. The devices for opening or closing a DC current at the feeders wait for a fixedly defined time or until they receive a command to close again. The voltage on the busbar 200 is recharged by the devices 2010; 2011; 2012; 2013; 2014; 2015; 2016 for opening or closing a DC circuit. The devices for opening or closing at the feeders are closed and possibly experience a switch-on transient. The devices for opening or closing a DC circuit at the consumers and at the photovoltaic installation, battery or capacitor bank are closed as soon as the voltage on the busbar 200 is re-established. If the devices for opening or closing a direct current at the feeders still detect a fault, they are switched off again and remain off.

Figure 5:
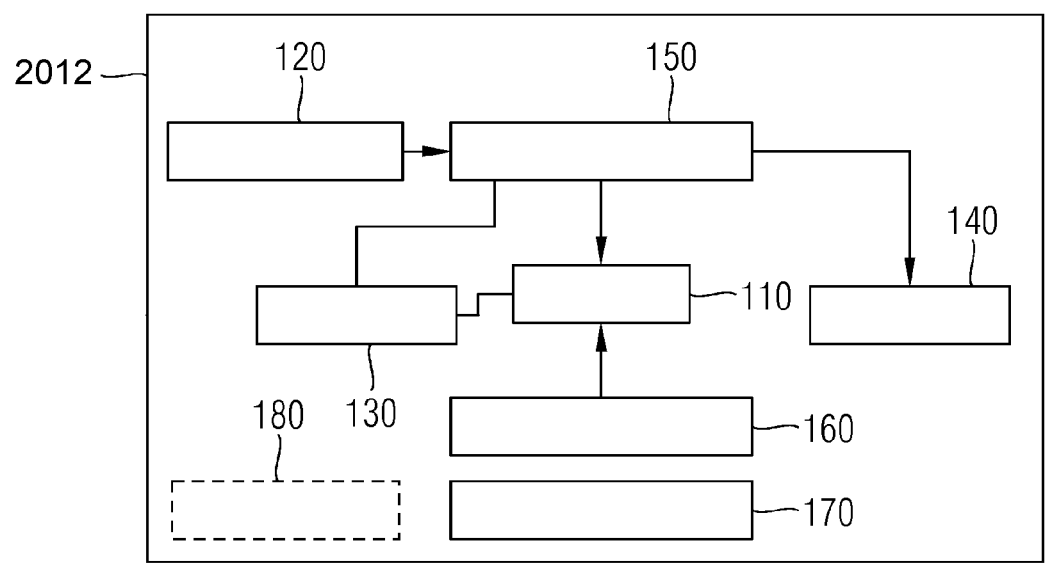
FIG. 5 shows a device for opening or closing a DC circuit.

FIG. 5 illustrates the device 2010; 2011; 2012; 2013; 2014; 2015; 2016, according to at least one example embodiment of the invention, for opening or closing a DC circuit having at least one busbar 200. The device 2010; 2011; 2012; 2013; 2014; 2015; 2016 for this purpose comprises an electrical switch 110 for opening or closing the DC circuit, a fault current identification mechanism 120, a trip unit gate driver 130 and a pre-charging device 140, wherein, upon detection of a fault current by the fault current identification mechanism 120, the electrical switch 110 opens the DC circuit by way of the trip unit 130, and wherein the pre-charging device 140 re-establishes the voltage on the busbar 200 before the electrical switch 110 is closed. For the automatic closure, provision is furthermore made in the device 2010; 2011; 2012; 2013; 2014; 2015; 2016, according to at least one example embodiment of the invention, for a control unit 150 that is able to automatically close the electrical switch 110 after the pre-charging.

The electrical switch 110 of the device 2010; 2011; 2012; 2013; 2014; 2015; 2016, according to at least one example embodiment of the invention, may for example be a semiconductor switch. By way of example, it may be a semiconductor switch based on silicon (Si), based on silicon carbide (SiC) or based on gallium nitride (GaN).

As illustrated in FIG. 5, the device 2010; 2011; 2012; 2013; 2014; 2015; 2016, according to at least one example embodiment of the invention, may furthermore comprise a communication unit 180. This communication unit 180 may receive commands from a superordinate control unit and/or coordinate devices 2010; 2011; 2012; 2013; 2014; 2015; 2016 arranged in a distribution grid 2000.

The device 2010; 2011; 2012; 2013; 2014; 2015; 2016, according to at least one example embodiment of the invention, may furthermore comprise a control unit 160 for limiting the switch-on transient. By way of example, the control unit 160 may keep the high transient current at switch-on below the deactivation threshold values of the device 2010; 2011; 2012; 2013; 2014; 2015; 2016.

The device 2010; 2011; 2012; 2013; 2014; 2015; 2016, according to at least one example embodiment of the invention, may furthermore comprise a measurement unit 170 for measuring current and/or voltage values.

The pre-charging device 140 may re-establish the voltage on the busbar 200 after a first waiting time. As an alternative, the pre-charging device 140 re-establishes the voltage on the busbar 200 after receiving a command. The command may be given to the pre-charging device 140 via the communication unit 180.

The control unit 150 for automatically closing the electrical switch 110 may close said switch automatically after a second waiting time. The control unit 150 for automatically closing the electrical switch 110 may likewise close said switch following re-establishment of a voltage on the busbar 200 above a threshold value. To this end, the control unit 150 for automatically closing an electrical switch 110 may receive the voltage values on the busbar 200 from the measurement unit 170.

The invention claimed is:

1. An electrical grid containing feeders, consumers and an interposed distribution grid having at least one busbar and one or more devices to open or close a DC circuit, wherein the one or more devices comprise:

an electrical switch to open or close the DC circuit,
a fault current identification device,
a trip unit,
a pre-charging device, and
a control unit to automatically close the electrical switch after pre-charging,
wherein
in response to detection of a fault current by the fault current identification device, the electrical switch is configured to open the DC circuit via the trip unit, and the pre-charging device is configured to re-establish a voltage on the at least one busbar before the electrical switch is closed, and
the feeders are, in each case, configured to be individually electrically disconnected from the DC circuit via a corresponding one of the one or more devices to open or close the DC circuit;
wherein individual consumers are, in each case, configured to be individually electrically disconnected via a corresponding one of the one or more devices to open or close the DC circuit, and the interposed distribution grid includes electromechanical switches to isolate faults.

2. The electrical grid as claimed in claim 1, wherein the electrical switch is a semiconductor switch.

3. The electrical grid as claimed in claim 1, wherein the one or more devices include a communication unit.

4. The electrical grid as claimed in claim 1, wherein the one or more devices include a further control unit to limit a switch-on transient.

5. The electrical grid as claimed in claim 1, wherein the pre-charging device is configured to re-establish the voltage on the at least one busbar after a first waiting time.

6. The electrical grid as claimed in claim 1, wherein the pre-charging device is configured to re-establish the voltage on the at least one busbar after receiving a command.

7. The electrical grid as claimed in claim 1, wherein the control unit is configured to close said electrical switch following re-establishment of a voltage on the at least one busbar above a threshold value.

8. The electrical grid as claimed in claim 1, wherein the electrical grid is a DC circuit.

9. A method for operating an electrical grid as claimed in claim 1, the method comprising:
 in the event of a fault, opening all of the one or more devices to disconnect all of the feeders;
 after opening all of the one or more devices, opening only electromechanical switches close to a fault location to isolate the fault; and
 automatically closing the one or more devices.

10. The electrical grid as claimed in claim 1, wherein the electrical switch is a semiconductor switch.

11. The electrical grid as claimed in claim 1, wherein the one or more devices include a communication unit.

12. The electrical grid as claimed in claim 1, wherein the one or more devices include a further control unit to limit a switch-on transient.

13. The electrical grid as claimed in claim 1, wherein the pre-charging device is configured to re-establish the voltage on the at least one busbar at least one of after a first waiting time or after receiving a command.

14. The electrical grid as claimed in claim 1, wherein the control unit is configured to close said electrical switch automatically after a waiting time.

15. The electrical grid as claimed in claim 1, wherein the control unit is configured to close said electrical switch following re-establishment of the voltage on the at least one busbar above a threshold value.

16. The electrical grid as claimed in claim 1, wherein the electrical grid further comprises at least one electromechanical switch interposed between the one or more devices and the consumers.

17. The electrical grid as claimed in claim 5, wherein the control unit is configured to automatically close the electrical switch after a second waiting time.

18. The electrical grid as claimed in claim 6, wherein the pre-charging device is configured to receive the command via a communication unit.

19. The method for operating an electrical grid as claimed in claim 9, further comprising:
 when a fault is still detected at the feeders following the automatically closing the one or more devices, finally opening the one or more devices.

* * * * *

UNITED STATES PATENT AND TRADEMARK OFFICE
CERTIFICATE OF CORRECTION

| | | |
|---|---|---|
| PATENT NO. | : 12,176,163 B2 | Page 1 of 1 |
| APPLICATION NO. | : 17/599103 | |
| DATED | : December 24, 2024 | |
| INVENTOR(S) | : Shivansh Batra et al. | |

It is certified that error appears in the above-identified patent and that said Letters Patent is hereby corrected as shown below:

On the Title Page

Column 1 after item (22) please add item (30):
(30)    Mar. 29, 2019   (CN)........................ PCT/CN2019/080558
         Mar. 29, 2019   (CN)........................ PCT/CN2019/080554
         Mar. 29, 2019   (CN)........................ PCT/CN2019/080553

Signed and Sealed this
Twenty-fifth Day of February, 2025

Coke Morgan Stewart
*Acting Director of the United States Patent and Trademark Office*